Feb. 21, 1928.  
E. A. KUEN  
CLOSURE FASTENER  
Filed Jan. 14, 1924  
1,660,170  
4 Sheets-Sheet 1
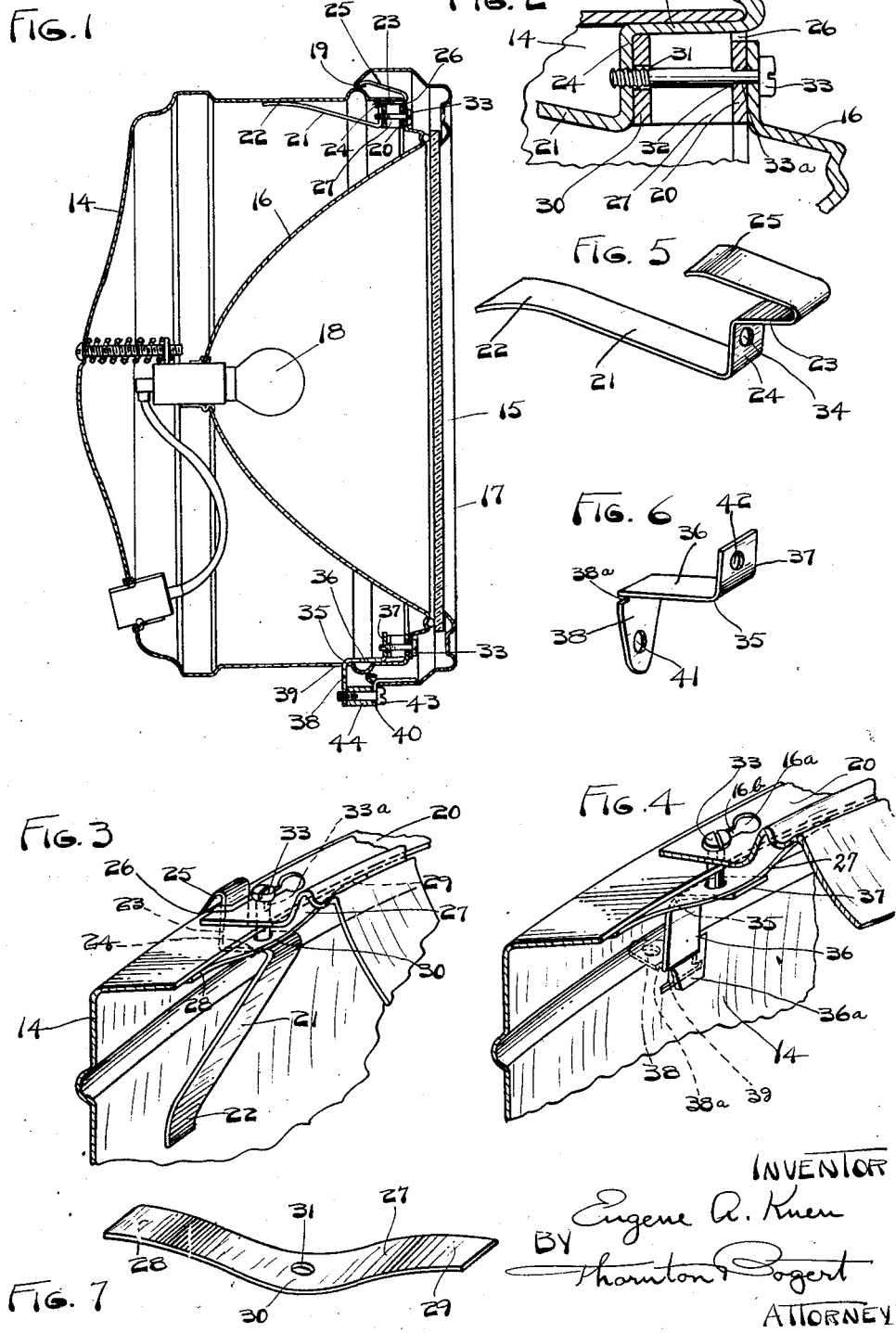

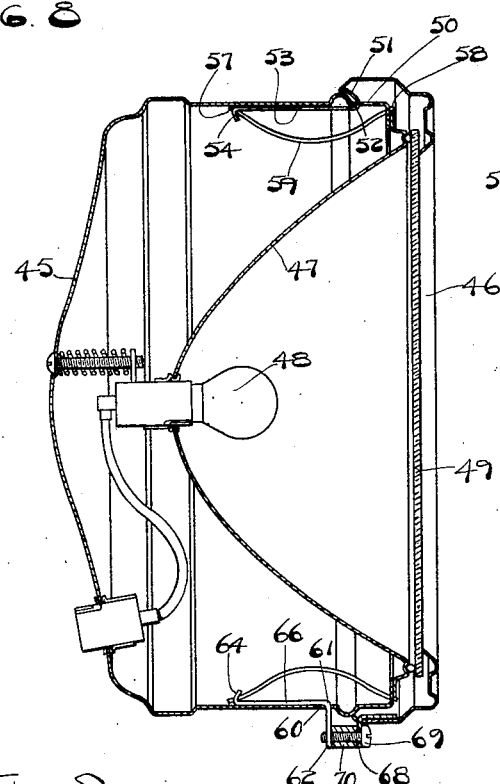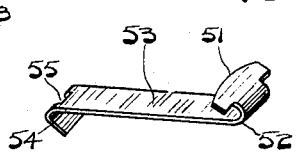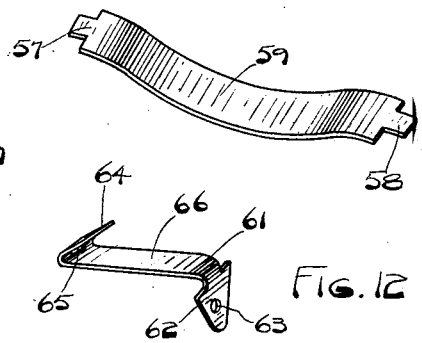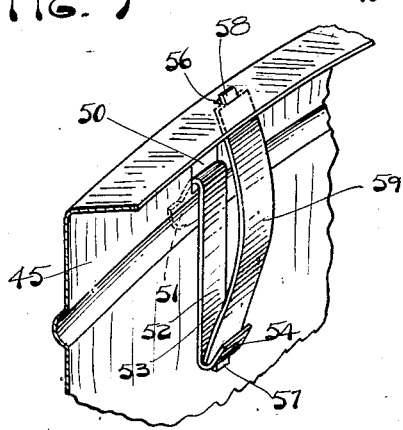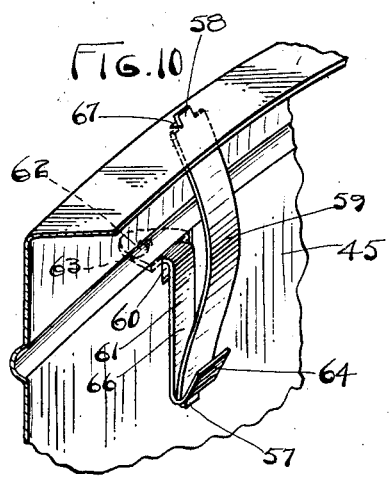

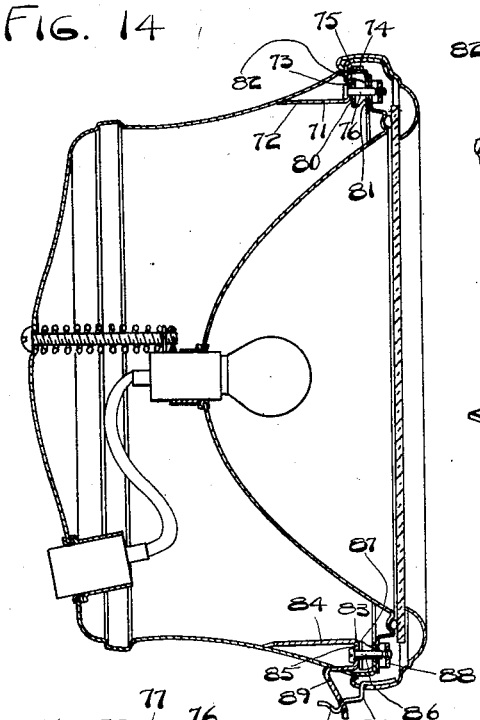
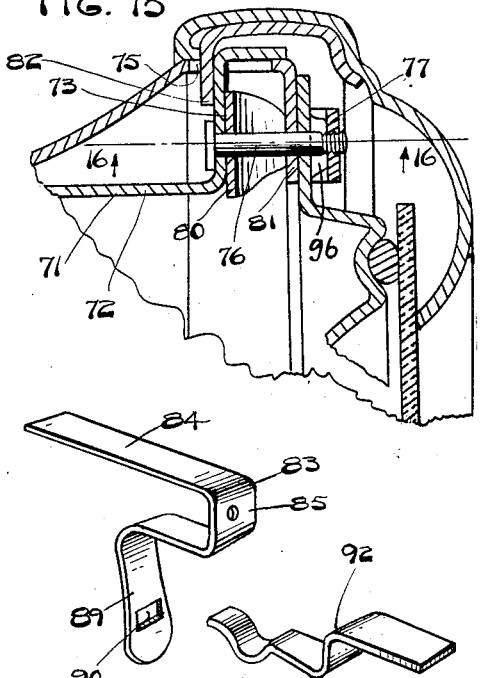
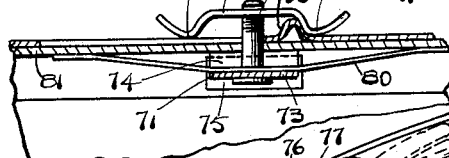
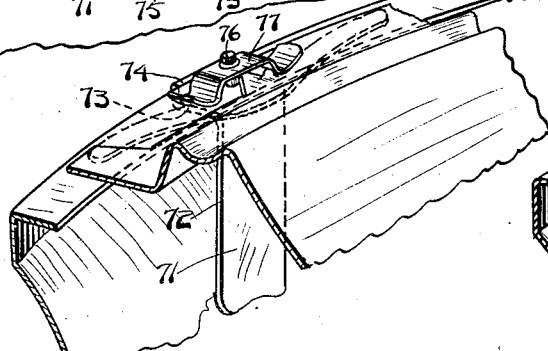
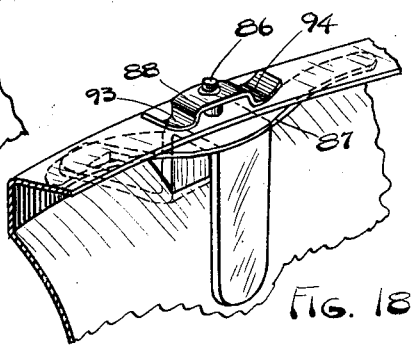
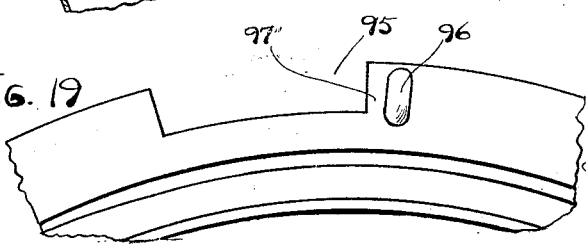

Feb. 21, 1928.　　　　　　　　　　　　　　　　　1,660,170
E. A. KUEN
CLOSURE FASTENER
Filed Jan. 14, 1924　　　　4 Sheets-Sheet 4

INVENTOR
BY Eugene A. Kuen
Thornton Bogert
ATTORNEY

Patented Feb. 21, 1928.

1,660,170

UNITED STATES PATENT OFFICE.

EUGENE A. KUEN, OF CINCINNATI, OHIO, ASSIGNOR TO THE THOS. J. CORCORAN LAMP COMPANY, OF CINCINNATI, OHIO, A CORPORATION OF OHIO.

CLOSURE FASTENER.

Application filed January 14, 1924. Serial No. 686,110.

This invention relates particularly to a closure fastener for automobile lamps and has been designed with a number of objects in view.

One object of my invention is to produce a lamp closure fastener of a materially simplified construction wihch will require much less effort to effect a satisfactory and completely dust proof, moisture proof and vibrationless securing of the lamp closure with relation to the lamp body.

A further object is to produce an improved lamp closure fastening in which all portions of the lamp closure are held with a substantially uniform degree of tension so that breakage of the closure glass is avoided through the elimination of unequal stresses on the closure rim.

A further object is to produce a lamp closure fastener which is cheap to produce, which is substantial, in which the parts are readily assembled with relation to the body and closure of the lamp, and in which the parts are inconspicuous and devoid of complications of manufacture, assembly and operation.

A further object is to produce a lamp closure fastener which in addition to its closure fastening functions will also secure the lamp reflector against inadvertent displacement either when the closure is in position on the lamp body or when the closure has been removed therefrom.

More specifically it is the object to provide a mounting mechanism for the door on the body of a lamp, in such a way as to provide for resilience as to the door and glass closure engagement, and at the same time permitting of the quick mounting and dismounting of the door without twisting it into engagement. My mounting devices, in fact, provide for a mechanism whereby the door is hooked on at one side and held with a screw, snap hook or similar device at the other.

These and others are attained in the lamp closure fastener described in the following specification and illustrated in the accompanying drawings in which:

Fig. 1 is a sectional elevation of an automobile lamp containing a fastener embodying my invention.

Fig. 2 is an enlarged fragmental sectional view of the fastening element located at the top of the lamp shown in Fig. 1, the door or closure having been removed.

Fig. 3 is an enlarged fragmental perspective view of the same element as shown in Fig. 2.

Fig. 4 is an enlarged fragmental perspective view of the fastening element located at the bottom of the lamp shown in Fig. 1, the door or closure having been removed.

Fig. 5 is an enlarged perspective view of the keeper of the top element shown in Figs. 2 and 3.

Fig. 6 is an enlarged perspective view of the keeper of the bottom element shown in Fig. 4.

Fig. 7 is an enlarged perspective view of a keeper actuating spring.

Fig. 8 is a sectional elevation of an automobile lamp containing a modified form of fastener embodying my invention.

Fig. 9 is an enlarged fragmental perspective view of the fastening element located at the top of the lamp shown in Fig. 8, the door or closure having been removed.

Fig. 10 is an enlarged fragmental perspective view of the fastening element located at the bottom of the lamp shown in Fig. 8, the door and certain of the fastening elements having been removed.

Fig. 11 is an enlarged perspective view of the keeper of the top element as shown in Fig. 9.

Fig. 12 is an enlarged perspective view of the keeper of the bottom element as shown in Fig. 10.

Fig. 13 is an enlarged perspective view of the spring which actuates the keepers of the modification shown in Figs. 8, 9 and 10.

Fig. 14 is a sectional elevation of an automobile lamp containing a stilll further modified form of fastener embodying my invention.

Fig. 15 is an enlarged fragmental sectional view of the fastening element located at the top of the lamp shown in Fig. 14.

Fig. 16 is an enlarged fragmental sectional view looking at the element disclosed in Fig. 15 from the direction of the arrows attached to line 16—16 thereof.

Fig. 17 is an enlarged fragmental perspective view of the element disclosed in Figs. 15 and 16.

Fig. 18 is an enlarged fragmental perspective view of the fastening element located at the bottom of the body as shown in Fig. 14.

Fig. 19 is a fragmental front view of a reflector prepared for use with my improved fastener.

Fig. 20 is a composite perspective view of two members of the bottom fastening element of my improved fastener as shown in Fig. 14.

Figure 21:
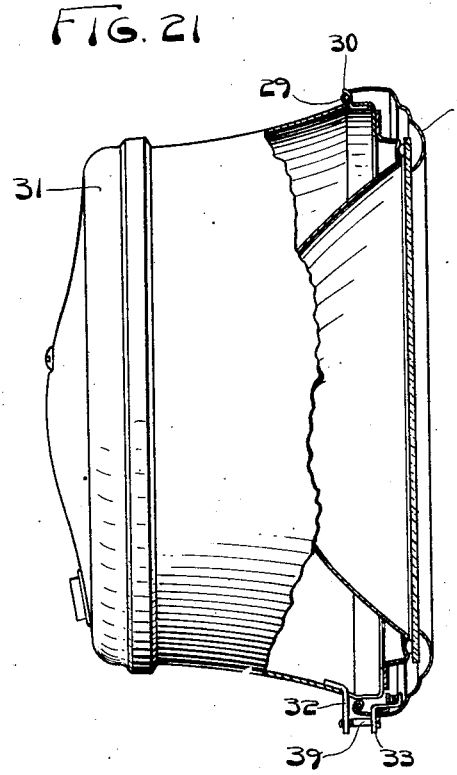
Fig. 21 is a partial elevational and sectional view of an automobile head lamp which is equipped with a further modified form of my invention.
Figure 22:
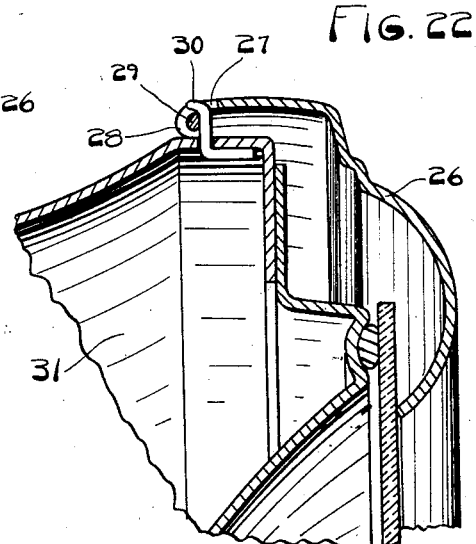
Fig. 22 is a materially enlarged fragmental sectional view of the fastening element such as located at the top of the head lamp shown in Fig. 21.

The construction shown in Figs. 1 to 7 inclusive of my invention, is illustrated in connection with a lamp body 14 and closure rim 15 of the usual conventional shape. Within these are the usual reflector 16 and closure glass 17 with a lamp bulb 18 provided as the source of light. I have shown quite a simple form of closure rim which has its rear edge 19 turned in as is usual in lamp constructions, thus forming an engaging lug, such lug being shown herein as integral with the closure rim although it may as readily be formed separately. The body 14 of the lamp I have shown, is provided with a flange 20 at its open end. Located within the body and beneath the flange at the top of the lamp, I provide a keeper 21. This keeper, largely because of the shape of the lamp body shown in connection therewith, is provided with a supporting leg 22, a straight portion 23 in alignment therewith, a shelf 24 and a hook 25. Leg 22 and portion 23 support the keeper and permit of its reciprocation axially of and within the body 14 against the inner face thereof. Hook 25 extends through a slot 26 in the lamp body and turns slightly outwardly and rearwardly to engage the inturned cooperating surface 19 of the closure rim. Between flange 20 and shelf 24 of the body and keeper respectively, I locate the keeper actuating spring 27. This spring is in semi-elliptic shape and bears at its ends 28 and 29 upon the under side of flange 20, the central portion 30 of the spring bearing upon shelf 24 of the keeper. In central portion 30 I provide an aperture 31 and in flange 20 I locate an aperture 32 for the passage through both of a spring tensioning and motion limiting extension such as a screw, pin, stop or stud which enters an aperture 34 in shelf 24 of the keeper. Thus the spring is tensioned by the screw, pin, stop or stud 33 holding the keeper against it, and the parts are held in place. An added feature of my invention lies in the reflector fastening or retaining function which it performs. The screw 33 passes through a slot in the reflector rim, one end 16$^a$ of which is enlarged to permit the head of the screw to pass through it and the other end 16$^b$ of which is narrower than the screw threaded shank of the screw. For the purpose of permitting the passage of the screw shank into this portion of the slot I provide flats 33$^a$ on opposite sides of the shank. Thus when the spring 27 has been properly tensioned by the screw 33, the enlarged portion 16$^a$ of the reflector slot is brought over the screw head, the screw is then turned to bring its flattened shank sides in alignment with the narrow portion of the slot, and the reflector is then rotated in the body to lock it beneath the screw head and incidentally lock the screw against rotation.

At the bottom of the lamp a construction which is similar to that at the top of the lamp, is provided. The similarity lies in the manner in which it operates and in the provision of another spring 27 for effecting its operation as well as the reflector holding function it performs. In the bottom fastening construction however, the keeper 35 is of an entirely different shape and operates somewhat differently. A straight portion 36 which corresponds to portion 23 of the top keeper, terminates at one end in a shelf 37 which bears against the spring as does shelf 24 of the top keeper, the opposite end of the straight portion terminating in an outturned lug 38 which extends through a slot 39 in the side and at the bottom of the lamp body. This slot is provided with an enlarged end to allow the lug 38 to be passed through the body, the remainder of the slot being narrower to be occupied by the narrow portion of the lug between its notches 38$^a$ so as to be guided thereby. A plate 36$^a$ which is slipped over the lug 38 to close the slot 39 effectively, moves up and down with the movements of the keeper 35 and prevents dust and moisture from entering the body. This lug 38 cooperates with an outturned lug 40 on the closure rim in the following manner. In lug 40 an aperture located therein permits of the passage of a screw 43, lug 38 of the keeper having a screw threaded aperture 41 to receive the end of the screw. Shelf 37 is provided with a screw threaded aperture 42 so that another screw 33 may be passed through apertures in the flange and spring as at the top of the lamp, in order to tension the spring and hold the parts in place. A collar 44 is located between lugs 38 and 40 to limit the tightening movement of screw 43.

In the construction disclosed in Figs. 8 to 13 of the drawings the body 45 and closure rim 46 are shown as of the same design as disclosed in Fig. 1, containing a reflector 47 which has a lamp bulb 48 therein, being closed by a closure glass 49. In this construction, as in the previously described construction, I have also provided fastening elements located at the top and bottom of the lamp. However there is no difference in the operation and functioning of this closure fastening of modified construction although the parts are located in relatively different positions. At the top of the lamp the body is provided with a slot 50 through which extends the hooked end 51 of a keeper 52 which is provided with a straight portion 53 which bears against the inner face of the body 45. The inner end 54 of keeper 52 may be hooked and provided with a slot 55 which cooperates with a slot 56 in the casing for receiving the ends 57 and 58 of a semi elliptic spring 59 when the spring is sprung into the position shown. The hooked end 51 engages beneath the inturned edge of the closure rim as shown in Fig. 8.

At the bottom of the lamp the cooperating fastening element is located. This element is similar to the top element inasmuch as its principle of operation is the same. The distinction lies in the keeper and its cooperation with the closure rim. A slot 60 in the lamp body permits of the location therein of the keeper 61, the outer end or lug 62 of the keeper having a screw threaded aperture 63 therein, the inner end 64 having a slot 65 therein. Between the ends 62 and 64 a straight portion 66 is located for bearing against the inner wall of the lamp body. Slot 65 cooperates with a slot 67 in the flange of the body, for receiving the ends 57 and 58 of another one of the springs 59 when it is sprung into position. Lug 62 cooperates with a lug 68 on the closure 46 by being secured thereto by means of a screw 69, a spacing collar 70 being provided as in the previously described construction.

In both of the constructions I have described I have shown but one type, style, or design of lamp. The features of the invention are as applicable to any style, type or design of lamp as to the lamp I have shown, and in order that its ready application to other types, styles or designs may be understood, I have shown an additional embodiment as disclosed in Figs. 14 to 20 inclusive of the drawings. In this disclosure the design is that of a flared lamp body with that of a slightly different closure design. The fastening elements in this instance have been especially designed for this flared or semi-drum type construction. The top fastening element consists of a keeper 71 which has an inner leg 72 adapted to engage and operate against the inner wall of the lamp body, a shelf 73 being formed therein, which terminates in a plate 74 lying against the outer wall of the body. The keeper shelf extends through a slot 75 in the body wall and has an aperture in which is located a retaining screw 76. The end of screw 76 is provided with a peculiarly shaped elongated nut 77 which has two feet 78 and 79, the function of which will be described presently. In order to hold the keeper, screw and nut in place I have provided a spring 80 which lies between the inturned flange 81 of the body and the shelf 73 of the keeper. The ends of this spring bear upon the under face of the body flange, and, the central portion of the spring being held in place by the screw, bears upon the keeper shelf. The closure is provided with a lug 82 which engages the underface of shelf 73 through slot 75 as shown in Figs. 14 and 15.

The bottom fastening element in this embodiment consists of a keeper 83 which has a leg 84 and a shelf 85 similarly arranged and provided with a screw 86, spring 87 and nut 88 which are arranged to operate the same as the corresponding members 71, 72, 73, 76 and 77 of the top element construction. However the keeper 83 is provided with a downturned and outwardly extending spring lug 89 which has a hole 90 therein adapted to receive the spring catch 91 of a lug 92 which is secured to the closure rim. The nut 88 is provided with feet 93 and 94 and performs the same functions as does nut 77, which functions will now be described. In assembling the parts of the lamp before the closure is placed in position, the reflector, which is provided with notches 95 at the top and bottom, is placed in position with these notches over the nuts 77 and 88. Adjacent to each of these notches a hump 96 is provided, so that when the reflector is rotated the humps at the top and bottom of the reflector are brought beneath the feet 79 and 94 of the respective nuts 77 and 88 as shown in Fig. 16 the hump being so located as to bring the edge 97 of the notch against the screw 76 or 86 with which it cooperates. The inclined sides of the hump and nut are adapted to hold the end 97 of the notch against the screw which holds the nut so that with the reflector being held in this manner at both top and bottom, there can be no inadvertent displacement either axially or transversely.

In operating the fastener I have shown in Figs. 14 to 20 inclusive, the lug 82 of the closure is placed in position to engage the underside of shelf 73 through slot 75. It is impossible to engage the upperside of the shelf through the slot, because the plate 74 blocks entrance to the slot above the shelf. With the closure thus in position at its upper end, the lower end is swung toward the body and the spring catch 91 is pressed through the opening 90 of the spring lug 89. This operation brings down the closure into locked position with relation with the body and as in the previously described constructions results in a uniform or substantially uniform degree of pressure being exerted upon all portions of the closure rim, closure glass and reflector.

Thus have I demonstrated the adaptability of the fastener or lock I have devised, to any style, type or design of lamp and I have also shown that in so applying the invention I may vary the number of fastening elements about the periphery of the lamp and may change the shape of the parts to render them as applicable to one type of lamp as to another without departing from the spirit and scope of the invention as set forth in the claims which are hereto annexed.

In the operation of both forms of the improved closure fasteners which I have shown in Figs. 1 to 13 inclusive, the top of the closure rim is placed in position upon the lamp body with its turned in edge in hooked engagement with the outturned end of the keeper which is located at the top of the lamp body. The lower portion of the closure is then pushed toward the lamp body until the closure lugs permit of the clamping element engaging the lower fastening keeper. With the lug spacing collar in position on the clamping element, the lugs are secured together, the operation drawing the keeper against the tension of the spring to hold the closure yieldingly in closed relation to the body and reflector. The first operation of placing the closure in position with relation to the body, is to hold it at an angle to the body to engage the hooked end of the top keeper. In this position the closure glass will touch the edge of the reflector at its top, thus holding the closure outwardly at an angle and necessitating forceable movement of the closure toward the reflector to bring it against the remainder of the reflector edge against the tension of the top fastening spring. The closure, then manually retained in this position, permits the clamping element to be brought into locking engagement with the lugs of the closure and keeper at the bottom of the lamp in order to bring the lower fastening spring also under tension, as has been previously described. With the closure thus secured and held in position mechanically, there is no restraint upon the closure to prevent its fastening springs from equalizing themselves as to the tension which they exert upon the closure, thereby giving a substantially uniform pressure of the closure rim upon the glass and reflector edge. With this uniform degree of tension the sealing of the reflector and closing of the body is accomplished in a most effective manner to exclude dust and moisture and to prevent rattle, vibration and damage.

In Figs. 21 to 25 inclusive the form of the invention which I have disclosed is slightly different from those I have previously disclosed. The difference lies in the provision of resilient means on the closure and relatively rigid means on the body instead of the reverse condition as I have shown above. As an exemplification of the idea I have suggested, I have shown the closure 26 notched as at 27 and have provided in the beaded rear edge 28 thereof a resilient keeper in the form of a wire spring 29. The notch 27 is somewhat wider than a rigid lug 30 which extends from the body 31 of the lamp, so that a yielding or bending action may take place when the closure is in position, the lug 30 being positioned and turned slightly backward to facilitate a hooking action at the top of the lamp.

Figure 23:
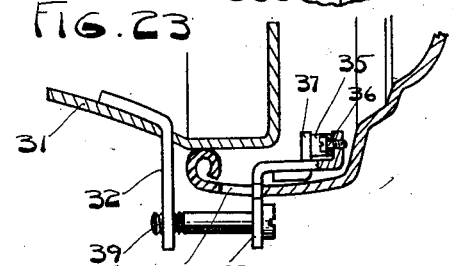
Fig. 23 is a view somewhat similar to Fig. 22, but showing the fastening element which is located at the bottom of the lamp as shown in Fig. 21.
Figure 24:
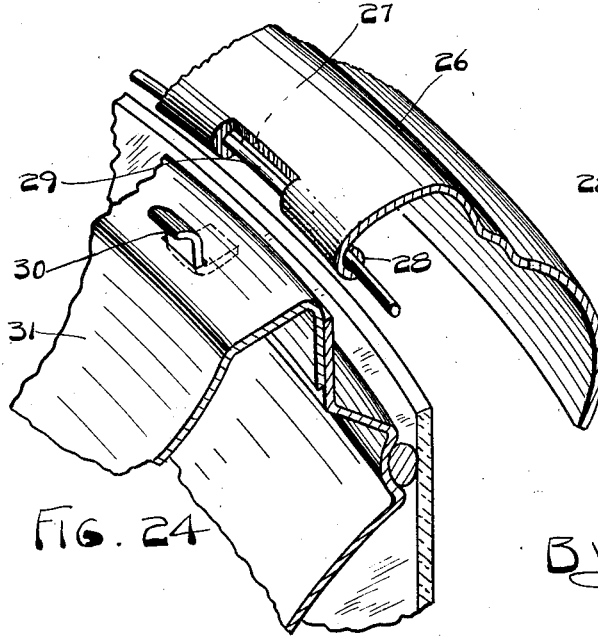
Fig. 24 is an enlarged fragmental perspective view of the fastening element shown in Fig. 22, but with the lamp members disclosed as in separated relation to one another.
Figure 25:
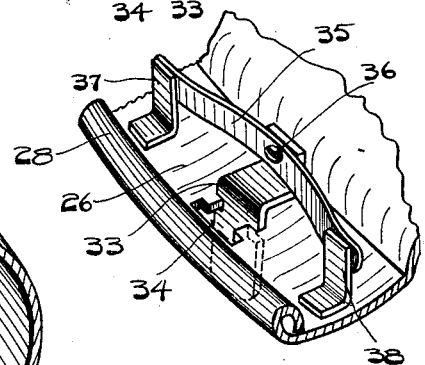
Fig. 25 is an enlarged fragmental perspective view of the closure portion of the fastening element shown in Fig. 23.

The lower fastening element, which is disclosed in Figs. 23 and 25, consists of a rigid lug 32 which depends from the body 31 and a resilient keeper 33 of the closure. Keeper 33 operates in a closure slot 34 in an axial direction, and is yieldingly retained in a forward position therein by a spring 35 to which it is attached as shown at 36, the ends of the spring bearing upon shelves 37 and 38 extending from the inner surface of the closure rim as shown. A screw 39 passes through keeper 33 and into lug 32 in order that the closure may be drawn yieldingly into position after its upper end is hooked into position, the action being in all respects quite similar to that of the constructions previously described.

I have described more modifications than are perhaps necessary to the full exposition of the features of my invention, but this has been done out of abundant caution, to the end that the essential principles in common to the many forms of the invention can be readily understood. This common principle is best explained in negative terminology, namely to provide a lamp closure having a body, a glass, and a door, in which the door bears on the glass uniformly, but with resilient play, in which the mounting operations are simple, and in which the mounting structures do not require a twisting of the door and body relatively to each other, and in which the mounting devices on the body and door do not project inwardly from their peripheries.

Having thus described my invention what I claim is:

1. Fastening means between the casing and closure of a lamp including a keeper, means at the forward end of the casing to slidably support the keeper, a spring between the keeper and the casing, means engaging a portion of the casing and the keeper to hold the keeper against the spring and to a movement parallel to the axis of the lamp, said means embracing a portion of the keeper to cooperate with the casing to confine it to a bodily reciprocatory movement parallel to the axis of the lamp, the closure having means to interlock with the lamp through the keeper at one point, and means at a remote point to hold the closure to the lamp.

2. Fastening means between the body and closure of a lamp comprising a keeper reciprocable only in a direction parallel to the axis of the lamp, a spring between the keeper and a portion of the lamp body with means to adjust the keeper in its reciprocable motion to tension the spring, means to hold the keeper during its entire motion to a movement parallel to the axis of the lamp, means on the closure cooperative with the keeper to lock the closure to the lamp at one point and closure locking means also movable in a direction parallel with the axis of the lamp to hold the closure to the lamp at another and remote point.

3. Fastening means for the body and closure of a lamp comprising a keeper located mainly within the lamp body and adapted to have reciprocation therein bodily in a direction parallel to the axis of the lamp, a portion of said keeper extending beyond the body for cooperation with the closure to lock the closure to the lamp at one point, a shelf being formed on the portion of the keeper lying within the lamp body, a spring located within the body and bearing upon the shelf and body, adapted yieldingly to retain the keeper in retracted position within the body, and means to hold the closure to the lamp at a point remote from the first mentioned point.

4. Fastening means for the body and closure of a lamp comprising a keeper within the lamp body mounted for reciprocation in a direction parallel to the axis of the lamp and lying against the inner wall of the lamp body, a portion of said keeper projecting outside the body into cooperative relation with the closure to hold the closure to the lamp at one point, a shelf formed on the keeper, a spring bearing upon the body and against the shelf for flexure between its ends, and means to yieldingly hold the closure to the lamp at a point remote from the first mentioned point.

5. Fastening means for the body and closure of a lamp comprising a keeper within the body mounted for reciprocation in a direction parallel to the axis of the lamp and lying against the inner wall of the lamp body, a portion of said keeper projecting from said body into cooperative relation with the closure, a shelf formed on the keeper, a spring supported at its ends and located between the bearing upon the body and the shelf for flexure between its ends, means on the closure for cooperative engagement on the projecting portion of the keeper to lock the closure to the lamp at one point, and means to hold the closure to the lamp at a point remote from the first mentioned point.

6. A lamp closure fastening means comprising a member mainly within the lamp body, but extending outside thereof, means for holding said member to a reciprocatory movement parallel to the axis of the lamp body, the closure having a hook portion cooperating with said member to hold the closure to the lamp body at one point, and a second member also mainly within the lamp body but extending outwardly therefrom with means for holding it to a reciprocal movement parallel to the axis of the lamp, and fastening means on the closure cooperative with the second member to normally hold the closure to the lamp body at a point remote from the first mentioned point, but allow movement of the closure in a direction parallel with the axis thereof at said second mentioned point.

In testimony whereof I have hereunto affixed my signature.

EUGENE A. KUEN.